US012068002B2

(12) United States Patent
Piechowiak et al.

(10) Patent No.: US 12,068,002 B2
(45) Date of Patent: *Aug. 20, 2024

(54) HEARING DEVICE WITH OWN-VOICE DETECTION AND RELATED METHOD

(71) Applicant: GN Hearing A/S, Ballerup (DK)

(72) Inventors: Tobias Piechowiak, Ballerup (DK); Rob De Vries, Ballerup (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,566

(22) Filed: Jan. 4, 2022

(65) Prior Publication Data

US 2022/0130418 A1 Apr. 28, 2022

Related U.S. Application Data

(63) Continuation of application No. 16/667,855, filed on Oct. 29, 2019, now Pat. No. 11,244,699.

(30) Foreign Application Priority Data

Dec. 20, 2018 (EP) .................................... 18214836

(51) Int. Cl.
*G10L 25/78* (2013.01)
*G10L 25/18* (2013.01)
(Continued)

(52) U.S. Cl.
CPC .............. *G10L 25/78* (2013.01); *G10L 25/18* (2013.01); *G10L 25/21* (2013.01); *H04R 25/405* (2013.01);
(Continued)

(58) Field of Classification Search
None
See application file for complete search history.

(56) References Cited

U.S. PATENT DOCUMENTS

| | | | |
|---|---|---|---|
| 7,512,245 | B2 | 3/2009 | Rasmussen et al. |
| 10,142,745 | B2 | 11/2018 | Petersen et al. |

(Continued)

FOREIGN PATENT DOCUMENTS

| | | |
|---|---|---|
| CN | 108200523 | 6/2018 |
| EP | 2988531 | 2/2016 |

OTHER PUBLICATIONS

Notice of Allowance for U.S. Appl. No. 16/667,855 dated Oct. 8, 2021.

(Continued)

*Primary Examiner* — Paul W Huber
(74) *Attorney, Agent, or Firm* — Vista IP Law Group, LLP

(57) ABSTRACT

A hearing device includes: a first microphone and a second microphone for provision of a first microphone input signal and a second microphone input signal, respectively; a voice detector module configured to process the first microphone input signal and the second microphone input signal, the voice detector module configured to detect own-voice of a user of the hearing device; a processor configured to process the first microphone input signal and the second microphone input signal for provision of an electrical output signal based on the first microphone input signal and the second microphone input signal; and a receiver configured to convert the electrical output signal to an audio output signal; wherein the voice detector module is configured to notify a detection of the own-voice to the processor if at least two of a first voice criterion, a second voice criterion, and a third voice criterion are satisfied.

35 Claims, 3 Drawing Sheets

(51) Int. Cl.
*G10L 25/21* (2013.01)
*H04R 25/00* (2006.01)

(52) U.S. Cl.
CPC ..... *H04R 25/505* (2013.01); *H04R 2225/021* (2013.01)

(56) References Cited

U.S. PATENT DOCUMENTS

| | | | |
|---|---|---|---|
| 2006/0262944 | A1 | 11/2006 | Rasmussen et al. |
| 2013/0148829 | A1 | 6/2013 | Lugger |
| 2018/0146307 | A1 | 5/2018 | Petersen et al. |

OTHER PUBLICATIONS

Amendment Response to FOA for U.S. Appl. No. 16/667,855 dated Sep. 28, 2021.
Final Office Action for U.S. Appl. No. 16/667,855 dated Jul. 29, 2021.
Amendment Response to NFOA for U.S. Appl. No. 16/667,855 dated Apr. 22, 2021.
Non-Final Office Action for U.S. Appl. No. 16/667,855 dated Jan. 22, 2021.
Extended European Search Report dated Jun. 13, 2019 for corresponding European Application No. 18214836.1.
Foreign OA for CN Patent Appln. No. 201911307424.1 dated Aug. 12, 2023.
English Translation of Foreign OA for CN Patent Appln. No. 201911307424.1 dated Aug. 12, 2023.

HEARING DEVICE WITH OWN-VOICE DETECTION AND RELATED METHOD

RELATED APPLICATION DATA

This application is a continuation of U.S. patent application Ser. No. 16/667,855 filed on Oct. 29, 2019, pending, which claims priority to, and the benefit of European Patent Application No. 18214836.1 filed on Dec. 20, 2018. The entire disclosures of the above applications are expressly incorporated by reference herein.

FIELD

The present disclosure relates to a hearing device with own-voice detection and related method of operating a hearing device.

BACKGROUND

Reliable voice detection is essential for effective classification of acoustic scenes and thus for effective steering of a hearing device.

Own-voice detection is becoming more and more important due to higher communication requirements and the merging of different use cases for sound devices, i.e. hearing-aid versus music streamer. This multi-purpose usage might require different processing schemes depending on these different requirements. For example, when listening to (bass) music, it may not be desired that the occlusion of the own-voice interferes with the music, so active-occlusion-cancellation should be activated. Thus, this requires a reliable own-voice detection to only activate said processing when necessary and not drain the power supply.

SUMMARY

Accordingly, there is a need for hearing devices and methods with improved capability of detecting own-voice.

A hearing device is disclosed, the hearing device comprising a set of microphones comprising a first microphone and a second microphone for provision of a first microphone input signal and a second microphone input signal, respectively; a voice detector module connected to the first microphone and the second microphone for processing the first microphone input signal and the second microphone input signal, the voice detector module configured to detect own-voice of a user of the hearing device; a processor for processing the first microphone input signal and the second microphone input signal for provision of an electrical output signal based on the first microphone input signal and the second microphone input signal; and a receiver for converting the electrical output signal to an audio output signal. The voice detector module is configured to determine if one or more voice criteria are satisfied; and in accordance with one or more voice criteria, such as at least two of a first voice criterion, a second voice criterion, and a third voice criterion, being satisfied, notify detection of own-voice to the processor.

Further, a method of operating a hearing device is disclosed, the hearing device comprising a processor and a voice detector module, the method comprising obtaining a first microphone input signal and a second microphone input signal; determining if one or more voice criteria are satisfied; and in accordance with one or more voice criteria, such at least two of a first voice criterion, a second voice criterion, and a third voice criterion, being satisfied, notifying detection of own-voice to the processor.

The present disclosure allows for improved and more accurate own-voice detection in turn allowing for improved hearing device processing, such as occlusion effect cancellation.

The improved and reliable own-voice detection provides extensive benefits to for example streaming music and automatic program switch in hearing devices as well as device-to-device communication.

Combining different voice criteria in the determination of own-voice presence provides a higher probability of correct own voice detection and fewer false positives and/or false negatives in turn improving own voice detection.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
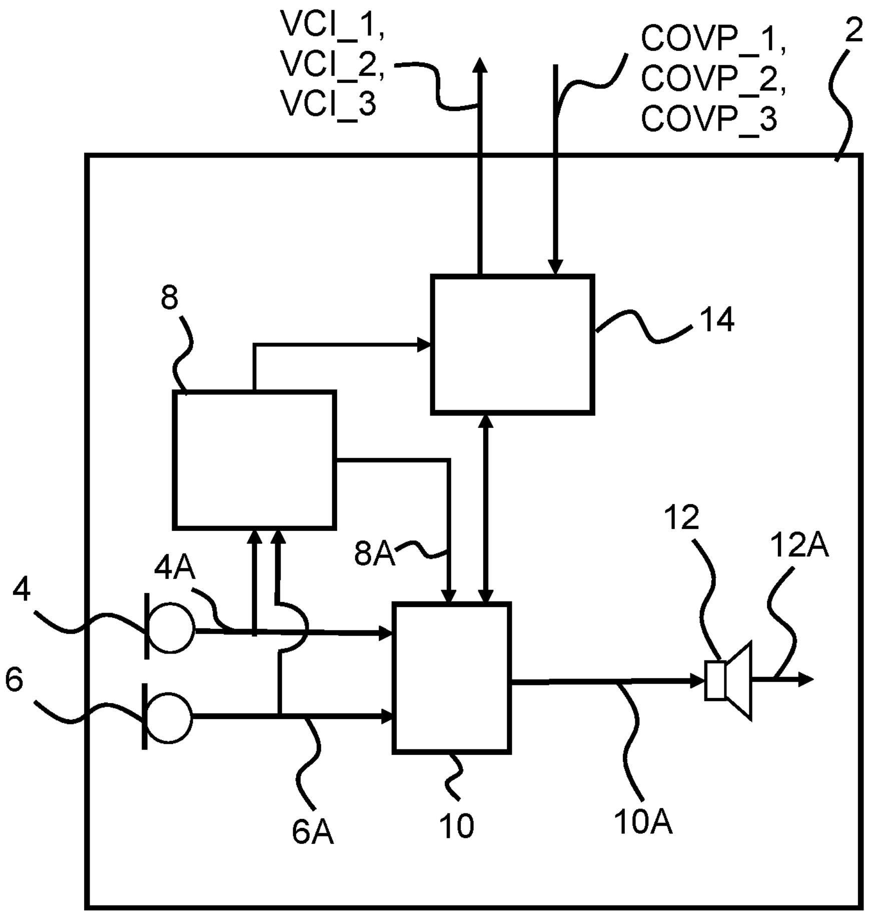
FIG. 1 schematically illustrates an exemplary hearing device according to the present disclosure, FIG. 2 schematically shows an exemplary voice detector module.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be a hearable or a hearing aid, wherein the processor is configured to compensate for a hearing loss of a user. The hearing device may be of the behind-the-ear (BTE) type, in-the-ear (ITE) type, in-the-canal (ITC) type, microphone-in-ear (MIE) type, receiver-in-canal (RIC) type and/or receiver-in-the-ear (RITE) type. The hearing aid may be a binaural hearing aid. The hearing device may comprise a first earpiece and a second earpiece, wherein the first earpiece and/or the second earpiece is an earpiece as disclosed herein.

The hearing device comprises a set of microphones comprising a first microphone and/or a second microphone for provision of a first microphone input signal and a second microphone input signal, respectively. The set of microphones may comprise one or more microphones. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal. In one or more exemplary hearing devices, the hearing device comprises a behind-the-ear part, wherein the first microphone is a front microphone of the behind-the-ear part. In one or more exemplary hearing devices, the hearing device comprises a behind-the-ear part, wherein the second microphone is a rear microphone of the behind-the-ear part. In one or more exemplary hearing devices, the hearing device comprises an ear part configured for placement at least partly in the ear canal of a user, wherein the second microphone is arranged in the ear part. In one or more exemplary hearing devices, the hearing device comprises an ear part configured for placement at least partly in the ear canal of a user, wherein the first microphone is arranged in the ear part, e.g. configured as an earcanal microphone for detecting sound in the (closed/occluded) ear canal, e.g. when the hearing device is a CIC hearing device.

The hearing device may be configured for wireless communication with one or more devices, such as with another hearing device, e.g. as part of a binaural hearing system, and/or with one or more accessory devices, such as a smartphone and/or a smart watch. The wireless input signal(s) may origin from external source(s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

Thus, the hearing device optionally comprises a wireless transceiver or a transmitter-receiver, e.g. including an antenna and radio transceiver coupled to the antenna, for receiving data from a contralateral hearing device. In an embodiment, the hearing device may include the antenna and the radio transceiver coupled to the antenna, for receiving one or more contralateral own-voice parameters from a contralateral hearing device. The wireless transceiver is connected to the voice detector module for provision of the one or more contralateral own-voice parameters to the voice detector module. In other words, the hearing device may comprise a wireless transceiver connected to the voice detector module for receiving one or more contralateral own-voice parameters, such as a first contralateral own-voice parameter, a second contralateral own-voice parameter and/or a third contralateral own-voice parameter, from a contralateral hearing device.

The first contralateral own-voice parameter COVP_1 may be a logical value (0 or 1) indicative of first voice criterion being satisfied (COVP_1=1) or not satisfied (COVP_1=0) in the contralateral hearing device. The first voice criterion may be based on the first contralateral own-voice parameter.

The second contralateral own-voice parameter COVP_2 may be a logical value (0 or 1) indicative of second voice criterion being satisfied (COVP_2=1) or not satisfied (COVP_2=0) in the contralateral hearing device. The second voice criterion may be based on the second contralateral own-voice parameter.

The third contralateral own-voice parameter COVP_3 may be a logical value (0 or 1) indicative of third voice criterion being satisfied (COVP_3=1) or not satisfied (COVP_3=0) in the contralateral hearing device. The third voice criterion may be based on the third contralateral own-voice parameter. Accordingly, both hearing devices of a binaural hearing system may contribute to the detection of own voice in each hearing device. This further improves the own-voice detection.

The voice detector module may be configured to transmit, via the wireless transceiver, one or more own-voice parameters, such as first own-voice parameter(s) and/or second own-voice parameter(s) and/or third own-voice parameter(s), to a contralateral hearing device. The voice detector module may be configured to transmit, via the wireless transceiver, one or more voice criterion indicators indicative of whether respective parts of voice criteria are satisfied in the hearing device.

In one or more exemplary hearing devices, the voice detector module may be configured to transmit a first voice criterion indicator VCI_1=1 to the contralateral hearing device when a part of the first voice criterion, e.g. P_1>P_E or P_1−P_E>TH_P, is satisfied in the hearing device (received as COVP_1 in the contralateral hearing device).

In one or more exemplary hearing devices, the voice detector module may be configured to transmit a second voice criterion indicator VCI_2=1 to the contralateral hearing device when a part of the second voice criterion, e.g. without COVP_2=1, is satisfied in the hearing device (received as COVP_2 in the contralateral hearing device).

In one or more exemplary hearing devices, the voice detector module may be configured to transmit a third voice criterion indicator VCI_3=1 to the contralateral hearing device when a part of the third voice criterion is satisfied in the hearing device (received as COVP_3 in the contralateral hearing device). Accordingly, the hearing device may communicate own voice detection and/or satisfaction of voice criteria to a contralateral hearing device.

The hearing device comprises a voice detector module connected to the first microphone and the second microphone for processing the first microphone input signal and the second microphone input signal. The voice detector module is configured to detect own-voice of a user of the hearing device, e.g. based on the first microphone input signal and/or the second microphone input signal. The voice detector module is configured to determine if one or more voice criteria are satisfied. The voice detector module is configured to, in accordance with one or more voice criteria being satisfied, notify detection of own-voice to the processor.

In one or more exemplary hearing devices, the voice detector module is configured to, in accordance with at least two of a first voice criterion, a second voice criterion, and a third voice criterion being satisfied, notify detection of own-voice to the processor.

In one or more embodiments, the voice detector module is configured to notify detection of own-voice to the processor by transmission of a notification. In an embodiment, the notification may be a logical value (0 or 1) indicative of own voice detection. In an embodiment, a notification value of 1 may indicate own voice detection and a notification value of 0 may indicate that own voice is not detected. In one or more embodiments, the notification may be transmitted from the voice detector module to the processor if a change in the notification has occurred i.e. a change in the notification from 0 to 1 or from 1 to 0. In an embodiment, the notification may be transmitted from the voice detector module to the processor periodically i.e. once per millisecond or once per 10 millisecond or once per 100 millisecond or once per second or once per 10 second or once per minute.

The first voice criterion may be based on one or more first own-voice parameters including a first primary own-voice parameter and/or a first secondary own-voice parameter.

The second voice criterion may be based on one or more second own-voice parameters including a second primary own-voice parameter and/or a second secondary own-voice parameter The third voice criterion may be based on one or more third own-voice parameter(s) including a third primary own-voice parameter and/or a third secondary own-voice parameter.

In one or more exemplary hearing devices/methods, the voice detector module comprises a power analyzer for provision of one or more power parameters based on one or more input signals including the first microphone input signal. A power parameter may form or constitute an own-voice parameter, such as a first own-voice parameter, and the first voice criterion is optionally based on the power parameter. In other words, the voice detector module may comprise a power analyzer for provision of power parameter(s) based on one or more input signals including the first microphone input signal, and wherein the first voice criterion is optionally based on the power parameter.

The one or more input signals for the power analyzer may comprise an error signal based on the first microphone input signal and one of a second microphone inputs signal or a filtered second microphone input signal, and wherein the first voice criterion is based on the error signal.

In one or more exemplary hearing devices, a first primary own-voice parameter OVP_1_1 of the first voice criterion is a first power parameter P_1 indicative of power of the first microphone input signal as a first primary own-voice parameter OWP_1_1 may be the power P_1 of the first microphone input signal.

In one or more exemplary hearing devices, a first secondary own-voice parameter OVP_1_2 of the first voice criterion is an error power parameter P_E indicative of power of an error signal, e.g. indicative of error between the first microphone input signal and a filtered second microphone input signal.

In one or more exemplary hearing devices, the first voice criterion VC_1 may be given by $$P\_E<P\_1.$$

In one or more exemplary hearing devices, the first voice criterion VC_1 may be given by $$P\_1-P\_E>TH\_P,$$

wherein TH_P is a power threshold.

In one or more exemplary hearing devices, the first voice criterion may be given by $$P\_E<P\_1 \text{ AND } COVP\_1=1,$$

wherein COVP_1=1 is indicative of satisfaction of P_E<P_1 in contralateral hearing device.

In one or more exemplary hearing devices, the first voice criterion may be given by $$P\_1-P\_E>TH\_P \text{ AND } COVP\_1=1,$$

wherein TH_P is a power threshold, COVP_1=1 is indicative of satisfaction of P_1−P_E>TH_P in contralateral hearing device.

In one or more exemplary hearing devices/methods, the voice detector module comprises an adaptive filter for filtering the second microphone input signal, and wherein the second voice criterion is based on one or more filter coefficients of the adaptive filter. Filter coefficient(s) of the adaptive filter may form or constitute own-voice parameter(s), such as second own-voice parameter(s). For example, the second own-voice criterion may be satisfied if the filter coefficients of the adaptive filter are indicative of a distinct peak at a certain sample. In one or more exemplary hearing devices/methods, the second own-voice criterion may be satisfied if the filter coefficients of the adaptive filter are indicative of a distinct peak at a certain sample and COVP_2=1, wherein COVP_2=1 is indicative of the filter coefficients of the adaptive filter are indicative of a distinct peak at a certain sample in contralateral hearing device. Own-voice is likely to be present when the adaptive filter has a distinct peak at one sample that also exceeds a certain threshold. An (adaptive) FIR filter with a distinct peak at a certain sample hints a certain fixed delay (time-of-arrival) between the microphones of a distinctive nearby source which is indicative of presence of own voice.

In one or more exemplary hearing devices/methods, the voice detector module comprises a spectrum analyzer for provision of a first spectrum parameter based on the first microphone input signal, and a second spectrum parameter based on the second microphone input signal, and wherein the third voice criterion is based on the first spectrum parameter and/or the second spectrum parameter.

Spectrum parameter(s) may form or constitute own-voice parameter(s), such as third own-voice parameter(s), and the third voice criterion is optionally based on the spectrum parameter(s). In other words, the voice detector module optionally comprises a spectrum analyzer for provision of spectrum parameter(s) based on the first microphone input signal and/or the second microphone input signal. The third voice criterion may be based on the spectrum parameter(s).

In one or more exemplary hearing devices, a third primary own-voice parameter OVP_3_1 of the third voice criterion is a first spectrum parameter SP_1 based on the first microphone input signal and optionally indicative of a low-frequency spectral input power of the first microphone input signal.

In one or more exemplary hearing devices, a third secondary own-voice parameter OVP_3_2 of the third voice criterion is a second spectrum parameter SP_2 based on the second microphone input signal and optionally indicative of a low-frequency spectral input power of the second microphone input signal.

Accordingly, the third voice criterion may be based on first spectrum parameter SP_1 and/or second spectrum parameter SP_2.

In one or more exemplary hearing devices, e.g. where the first microphone is a front microphone of BTE housing and the second microphone is an in-ear microphone of ear part of hearing device, or e.g. where the first microphone is a front microphone and the second microphone is a rear microphone of a BTE housing, the third voice criterion VC_3 may be given by $$SP\_1<SP\_2.$$

In one or more exemplary hearing devices, e.g. where the first microphone is a front microphone and the second microphone is an in-ear microphone, the third voice criterion VC_3 may be given by $$SP\_1<SP\_2 \text{ AND } COVP\_3=1,$$

wherein COVP_3=1 is indicative of satisfaction of SP_1<SP_2 in contralateral hearing device.

In one or more exemplary hearing devices, e.g. where the first microphone is an in-the-canal microphone and the second microphone is an outer-ear microphone (ambient), the third voice criterion VC_3 may be given by $$SP\_1>SP\_2.$$

In one or more exemplary hearing devices, e.g. where the first microphone is an in-the-canal microphone and the second microphone is an outer-ear microphone (ambient), the third voice criterion VC_3 may be given by $$SP\_1>SP\_2 \text{ AND } COVP\_3=1,$$

wherein COVP_3=1 is indicative of satisfaction of SP_1>SP_2 in contralateral hearing device.

The third voice criterion optionally applies a spectrum analyzer, such as an FFT, to analyze the low-frequency content of the microphone signals. Own-voice power is substantially bone-conducted into the ear canal and thus the ratio between low-frequencies and mid-and-high frequency power for the second microphone is relatively higher when own-voice is present than when it is not present. Additionally, when own-voice is present low-frequency power is higher for both microphones so the change of low-frequency power can be used as a voice criterion for the presence of own-voice activity.

In one or more exemplary hearing devices, the hearing device takes advantage of and relies partly on the voice detection in contralateral hearing device.

Thus, the first voice criterion may be given as $$COVP\_1=1,$$

wherein COVP_1=1 is indicative of satisfaction of P_E<P_1 in contralateral hearing device.

Thus, the second voice criterion may be given as $$COVP\_2=1,$$

wherein COVP_2=1 is indicative of the filter coefficients of the adaptive filter are indicative of a distinct peak at a certain sample in contralateral hearing device.

Thus, the third voice criterion may be given as $$COVP\_3=1,$$

wherein COVP_3=1 is indicative of satisfaction of SP_1>SP_2 in contralateral hearing device.

In one or more exemplary hearing devices/methods, the voice detector module is configured to determine if a fourth voice criterion based on first contralateral own-voice parameter(s) is satisfied. The voice detector module may be configured to, in accordance with one or more, such as at least two or at least three, voice criteria including the fourth voice criterion being satisfied, notifying detection of own-voice to the processor. In one or more exemplary hearing devices, the voice detector module may be configured to, in accordance with the first voice criterion and the fourth voice criterion being satisfied, notifying detection of own-voice to the processor.

A contralateral power parameter from a power analyzer of a contralateral hearing device, e.g. a hearing device as disclosed herein, may form or constitute the first contralateral own-voice parameter, i.e. the first contralateral own-voice parameter may comprise a contralateral power parameter.

In one or more exemplary hearing devices, the contralateral hearing device is configured to determine if the fourth voice criterion based on a power parameter of the contralateral hearing device is satisfied, the first contralateral own-voice parameter being indicative of whether the fourth voice criterion being satisfied in the contralateral hearing device.

In one or more exemplary hearing devices/methods, the voice detector module is configured to determine if a fifth voice criterion based on second contralateral own-voice parameter(s) is satisfied. The voice detector module may be configured to, in accordance with one or more, such as at least two or at least three, voice criteria, including the fifth voice criterion being satisfied, notifying detection of own-voice to the processor.

One or more contralateral filter coefficients of adaptive filter of a contralateral hearing device, e.g. a hearing device as disclosed herein, may form or constitute the second contralateral own-voice parameter, i.e. the second contralateral own-voice parameter may comprise contralateral filter coefficient(s).

In one or more exemplary hearing devices, the contralateral hearing device is configured to determine if the fifth voice criterion based on filter coefficients of an adaptive filter of the contralateral hearing device is satisfied, the second contralateral own-voice parameter being indicative of whether the fifth voice criterion being satisfied in the contralateral hearing device.

In one or more exemplary hearing devices/methods, the voice detector module is configured to determine if a sixth voice criterion based on a third contralateral own-voice parameter is satisfied. The voice detector module may be configured to, in accordance with one or more, such as at least two or at least three, voice criteria including the sixth voice criterion being satisfied, notifying detection of own-voice to the processor.

Contralateral spectrum parameter(s) may form or constitute the third contralateral own-voice parameter, and the sixth voice criterion is optionally based on the contralateral spectrum parameter(s). For example, the sixth voice criterion may be based on first contralateral spectrum parameter CSP_1 and/or second contralateral spectrum parameter CSP_2, e.g. as described in relation to the third voice criterion.

In one or more exemplary hearing devices, the contralateral hearing device is configured to determine if the sixth voice criterion based on contralateral spectrum parameter(s) of the contralateral hearing device is satisfied, the third contralateral own-voice parameter being indicative of the sixth voice criterion being satisfied in the contralateral hearing device.

The hearing device comprises a processor for processing the first microphone input signal and the second microphone input signal for provision of an electrical output signal based on the first microphone input signal and the second microphone input signal. The processor is optionally configured to compensate for hearing loss of a user of the hearing device. The processor is configured to process the first microphone input signal and the second microphone input signal based on an output of the voice detector module detecting own voice. For example, the processor may be configured to apply a first processing scheme when own voice is detected/present (as notified by voice detector module via own voice output signal) and/or apply a second processing scheme when own voice is not detected/absent. The first processing scheme is different from the second processing scheme.

The hearing device comprises a receiver for converting the electrical output signal to an audio output signal that is fed to the eardrum of the user during use.

Further, a method of operating a hearing device comprising a processor, a voice detector module, and a set of microphones comprising a first microphone and a second microphone, the method comprising obtaining a first microphone input signal and a second microphone input signal; determining if voice criteria are satisfied; and in accordance with one or more voice criteria, such as at least two of a first voice criterion, a second voice criterion, and a third voice criterion, being satisfied, notifying detection of own-voice to the processor.

The method may comprise determining a one or more power parameters based on one or more input signals including the first microphone input signal, and wherein the first voice criterion is based on the power parameter(s).

The method may comprise filtering the second microphone input signal with an adaptive filter, and wherein the second voice criterion is based on one or more filter coefficients of the adaptive filter.

The method may comprise determining one or more spectrum parameters based on the first microphone input signal and the second microphone input signal, and wherein the third voice criterion is based on the spectrum parameter(s).

In one or more exemplary hearing devices/methods, the voice detector module comprises a cross correlator for provision of one or more cross-correlation parameters based on the electrical output signal and a contralateral electrical output signal received via wireless transceiver of the hearing device. A first cross-correlation parameter CCP_1 may be indicative of the position k of maximum cross-correlation between the electrical output signal and the contralateral electrical output signal. The first voice criterion VC_1 may be based on the first cross-correlation parameter CCP_1 constituting a first own-voice parameter and may be given by $$CCP\_1<TH\_k,$$

where TH_k is a threshold, such as 1, 2, or 3. In such case the dominating sound source comes from the median plane, which is indicative of presence of own voice.

FIG. 1 shows an exemplary hearing device. The hearing device 2 comprises a set of microphones comprising a first microphone 4 and a second microphone 6 for provision of a first microphone input signal 4A and a second microphone input signal 6A, respectively; a voice detector module 8 connected to the first microphone 4 and the second microphone 6 for processing the first microphone input signal 4A and the second microphone input signal 6A, the voice detector module 8 configured to detect own-voice of a user of the hearing device. The hearing device 2 comprises a processor 10 for processing the first microphone input signal 4A and the second microphone input signal 6A for provision of an electrical output signal 10A based on the first microphone input signal 4A and the second microphone input signal 6A; and a receiver 12 for converting the electrical output signal 10A to an audio output signal 12A. The voice detector module 8 is configured to determine if voice criteria are satisfied; and in accordance with at least two of a first voice criterion, a second voice criterion, and a third voice criterion being satisfied, notify detection of own-voice to the processor via own voice output signal 8A. The hearing device 2 optionally comprise a wireless transceiver 14 connected to the voice detector module for receiving one or more contralateral own-voice parameters, such as a first contralateral own-voice parameter COVP_1 and/or a second contralateral own-voice parameter COVP_2 and/or a third contralateral own-voice parameter COVP_3, from a contralateral hearing device.

The voice detector module 8 may be configured to transmit one or more voice criterion indicators, e.g. VCI_1 and/or VCI_2 and/or VI_3 to the contralateral hearing via the wireless transceiver 14.

Figure 2:
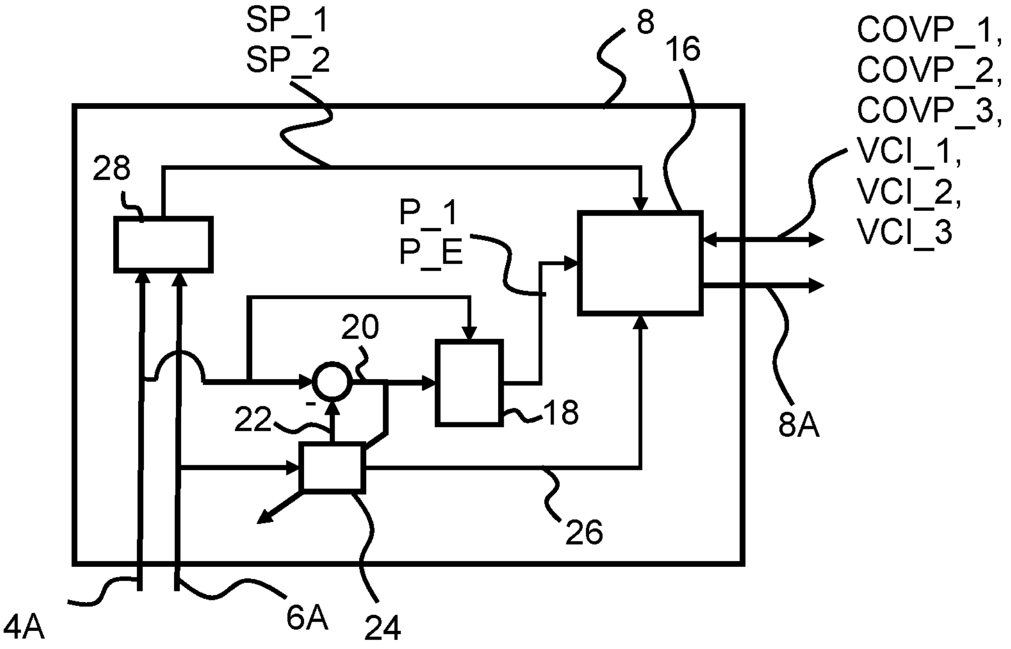

FIG. 2 shows an exemplary voice detector module. The voice detector module 8 comprises a detector controller 16 and a power analyzer 18 configured to provide, to the detector controller 16, a first power parameter P_1 indicative of the power of the first microphone input signal 4A from first microphone 4. The power analyzer 18 is configured to provide, to the detector controller 16, an error parameter P_E indicative of the power of an error signal 20 based on the first microphone input signal 4A and a filtered second microphone input signal 22.

The voice detector module 8 comprises an adaptive filter 24 for filtering the second microphone input signal 6A. One or more filter coefficients 26 of the adaptive filter 24 are fed to the detector controller 16, and wherein the second voice criterion is based on one or more filter coefficients of the adaptive filter.

The voice detector module 16 comprises a spectrum analyzer 28 configured to provide a first spectrum parameter SP_1 based on the first microphone input signal 4A, and configured to provide a second spectrum parameter SP_2 based on the second microphone input signal 6A. The first spectrum parameter SP_1 and the second spectrum parameter SP_2 are fed to the detector controller 16. The first spectrum parameter SP_1 is indicative of a low-frequency spectral input power of the first microphone input signal 4A, and the second spectrum parameter SP_2 is indicative of a low-frequency spectral input power of the second microphone input signal 6A.

The detector controller 16 of the voice detector module 8 is configured to determine if a first voice criterion based on P_1, P_E, and optionally COVP_1 is satisfied. The first voice criterion in detector controller 16 is given by (P_E<P_1) or by (P_E<P_1 AND COVP_1=1), wherein COVP_1=1 is indicative of satisfaction of P_E<P_1 in contralateral hearing device.

The detector controller 16 of the voice detector module 8 is configured to determine if a second voice criterion based on filter coefficients 26 and optionally COVP_2 is satisfied. The second own-voice criterion is optionally satisfied if the filter coefficients 26 are indicative of a distinct peak at a certain sample or if the filter coefficients 26 are indicative of a distinct peak at a certain sample and COVP_2=1, wherein COVP_2=1 is indicative of the filter coefficients of the adaptive filter are indicative of a distinct peak at a certain sample in contralateral hearing device.

The detector controller 16 of the voice detector module 8 is configured to determine if a third voice criterion based on SP_1, SP_2, and optionally COVP_3 is satisfied.

In hearing devices where the first microphone is a front microphone and the second microphone is an in-ear microphone, the third voice criterion VC_3 in detector controller 16 is be given by (SP_1<SP_2) or (SP_1<SP_2 AND COVP_3=1), wherein COVP_3=1 is indicative of satisfaction of SP_1<SP_2 in contralateral hearing device.

In hearing devices where the first microphone is an in-the-canal microphone and the second microphone is an outer-ear microphone (ambient), the third voice criterion VC_3 in detector controller 16 is be given by (SP_1>SP_2) or (SP_1>SP_2 AND COVP_3=1), wherein COVP_3=1 is indicative of satisfaction of SP_1>SP_2 in contralateral hearing device.

The detector controller 16 is configured to notify, via own voice output signal 8A, detection of own-voice to the processor in accordance with one or more, such as at least two of the first voice criterion, the second voice criterion, and the third voice criterion being satisfied. One criterion may be sufficient, e.g. if the respective criterion takes into account COVP's from contralateral hearing device.

Figure 3:
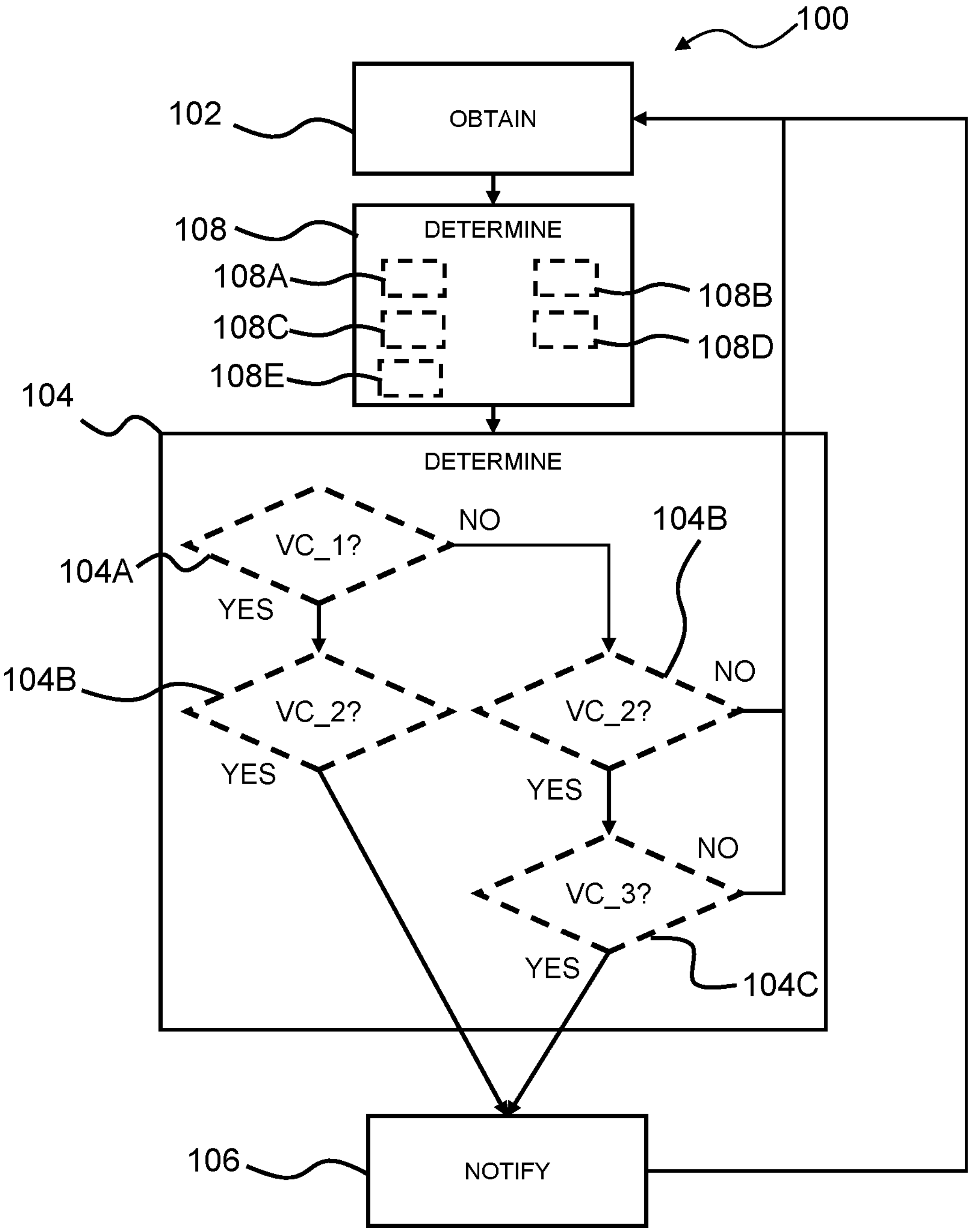
FIG. 3 is a flow diagram of an exemplary method according to the disclosure.

FIG. 3 shows a flow diagram of an exemplary method of operating a hearing device comprising a processor, a voice detector module, and a set of microphones comprising a first microphone and a second microphone. The method 100 comprising obtaining 102 a first microphone input signal and a second microphone input signal; determining 104 if voice criteria including a first voice criterion VC_1, a second voice criterion VC_2, and a third voice criterion VC_3 are satisfied; and in accordance with at least two of the first voice criterion VC_1, the second voice criterion VC_2, and the third voice criterion VC_3 being satisfied, notifying 106 detection of own-voice to the processor.

The method 100 comprises determining 104A if the first voice criterion VC_1 is satisfied, determining 104B if the second voice criterion VC_2 is satisfied, and determining 104C if the third voice criterion VC_3 is satisfied.

The method 100 comprises determining 108 own voice parameters for the criteria VC_1, VC_2, VC_3 including determining 108A, for the first voice criterion, a first power parameter based on the first microphone input signal and determining 108B, for the first voice criterion, an error power parameter based on an error signal between the first microphone input signal and a filtered second microphone input signal.

The method 100 comprises filtering 108C the second microphone input signal with an adaptive filter, and wherein the second voice criterion is based on one or more filter coefficients of the adaptive filter. In other words, filter coefficients for the second voice criterion are determined by the adaptive filtering.

The method 100 comprises determining 108D a first spectrum parameter SP_1 based on the first microphone input signal and determining 108E a second spectrum parameter SP_2 based on the second microphone input signal, and wherein the third voice criterion is based on the first spectrum parameter and the second spectrum parameter.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-3 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

2 hearing device
4 first microphone
4A first microphone input signal
6 second microphone
6A second microphone input signal
8 voice detector module
8A own voice output signal
10 processor
10A electrical output signal
12 receiver
12A audio output signal
14 wireless transceiver
16 detector controller
18 power analyzer
20 error signal
22 filtered second microphone input signal
24 adaptive filter
26 filter coefficients of the adaptive filter
28 spectrum analyzer
102 obtaining a first microphone input signal and a second microphone input signal
104 determining if voice criteria are satisfied
104A determining if first voice criteria is satisfied
104B determining if second voice criteria is satisfied
104C determining if third voice criteria is satisfied
106 notifying detection of own-voice to the processor
108 determining own voice parameter(s)

108A determining a first power parameter based on the first microphone input signal
108B determining an error power parameter based on an error signal between the first microphone input signal and a filtered second microphone input signal
108C filtering the second microphone input signal with an adaptive filter
108D determining a first spectrum parameter SP_1 based on the first microphone input signal
108E determining a second spectrum parameter SP_2 based on the second microphone input signal

The invention claimed is:

1. A hearing device comprising:
a first microphone and a second microphone for provision of a first microphone input signal and a second microphone input signal, respectively;
a voice detector module configured to process the first microphone input signal and/or the second microphone input signal, the voice detector module configured to detect own-voice of a user of the hearing device;
a processing unit configured to provide an electrical output signal; and
a receiver configured to convert the electrical output signal to an audio output signal;
wherein the voice detector module is configured to communicate with the processing unit regarding a detection of the own-voice of the user after at least two criteria are satisfied, wherein the at least two criteria comprise a first criterion and a second criterion, wherein the voice detector module is configured to detect the own-voice of the user by detecting a distinct peak at a certain sample associated with an adaptive filter; and
wherein the voice detector module comprises a controller and a power analyzer configured to provide a power parameter to the controller, and wherein the voice detector module comprises a spectrum analyzer coupled to the controller that is configured to obtain the power parameter from the power analyzer.

2. The hearing device according to claim 1, wherein the power analyzer is configured to provide the power parameter based on one or more input signals including the first microphone input signal, and wherein the first criterion involves the power parameter.

3. The hearing device according to claim 2, wherein the first criterion also involves a power of an error signal, the error signal being based on (1) the first microphone input signal and (2) the second microphone input signal or a filtered signal obtained by filtering the second microphone input signal.

4. The hearing device according to claim 1, wherein the first criterion is satisfied if a power of an error signal is less than the power parameter.

5. The hearing device according to claim 1, wherein the first criterion is satisfied if P_1−P_E>TH_P, wherein P_1 represents the power parameter, P_E represents a power of an error signal, and TH_P represents a threshold.

6. The hearing device according to claim 1, wherein the voice detector module comprises an adaptive filter.

7. The hearing device according to claim 1, wherein the controller of the voice detector module is configured to obtain a first spectrum parameter and a second spectrum parameter from the spectrum analyzer.

8. The hearing device according to claim 7, wherein the first spectrum parameter is indicative of a first low-frequency spectral input power of the first microphone input signal, and the second spectrum parameter is indicative of a second low-frequency spectral input power of the second microphone input signal.

9. The hearing device according to claim 1, wherein the voice detector module comprises the adaptive filter, wherein the controller of the voice detector module is also configured to obtain filter coefficients from the adaptive filter.

10. The hearing device according to claim 9, wherein the voice detector module also comprises a subtractor, the subtractor configured to obtain an output from the adaptive filter.

11. The hearing device according to claim 1, wherein the first microphone is a front microphone of a behind-the-ear part, and the second microphone is a rear microphone of the behind-the ear part.

12. The hearing device according to claim 1, wherein the first criterion or the second criterion involves a spectrum parameter.

13. The hearing device according to claim 1, wherein the voice detector module of the hearing device is configured to determine the first criterion or the second criterion as being satisfied when a first spectrum parameter associated with the first microphone is less than a second spectrum parameter associated with the second microphone.

14. The hearing device according to claim 1, wherein the hearing device is configured to receive data from a contralateral hearing device indicating that a voice detection criterion associated with the contralateral hearing device is satisfied.

15. The hearing device according to claim 1, wherein the spectrum analyzer and the power analyzer are configured to provide respective outputs to the controller of the voice detector module.

16. A hearing device comprising:
a first microphone and a second microphone for provision of a first microphone input signal and a second microphone input signal, respectively;
a voice detector module configured to process the first microphone input signal and/or the second microphone input signal, the voice detector module configured to detect own-voice of a user of the hearing device;
a processing unit configured to provide an electrical output signal; and
a receiver configured to convert the electrical output signal to an audio output signal;
wherein the voice detector module is configured to communicate with the processing unit regarding a detection of the own-voice of the user;
wherein the voice detector module comprises a spectrum analyzer for provision of a first spectrum parameter based on the first microphone input signal, and for provision of a second spectrum parameter based on the second microphone input signal, and wherein the voice detector module is configured to detect the own-voice of the user based on a criterion that the first spectrum parameter is less than the second spectrum parameter; and
wherein the voice detector module comprises a controller and a power analyzer, and wherein the spectrum analyzer and the power analyzer are configured to provide respective outputs to the controller of the voice detector module.

17. The hearing device according to claim 16, wherein the hearing device comprises a behind-the-ear part, wherein the first microphone is a front microphone of the behind-the-ear part.

18. The hearing device according to claim 16, wherein the hearing device comprises an ear part configured for placement at least partly in an ear canal of the user, wherein the second microphone is in the ear part.

19. The hearing device according to claim 16, wherein the hearing device comprises a wireless transceiver connected to the voice detector module for receiving data from a contralateral hearing device.

20. The hearing device according to claim 19, wherein the data comprises a first logical value.

21. The hearing device according to claim 20, wherein the data comprises a second logical value.

22. The hearing device according to claim 20, wherein the first logical value is a Boolean data having one of two possible values.

23. The hearing device according to claim 16, wherein the first microphone is a front microphone of a behind-the-ear (BTE) unit, and the second microphone is a rear microphone of the BTE unit.

24. The hearing device according to claim 16, wherein the second microphone is an in-the-canal microphone, and the first microphone is an outer-ear microphone.

25. The hearing device according to claim 16, wherein the first spectrum parameter is indicative of a first low-frequency spectral input power of the first microphone input signal, and the second spectrum parameter is indicative of a second low-frequency spectral input power of the second microphone input signal.

26. The hearing device according to claim 16, wherein the hearing device is configured to receive data from a contralateral hearing device indicating that a voice detection criterion associated with the contralateral hearing device is satisfied.

27. A hearing device comprising:

a first microphone and a second microphone for provision of a first microphone input signal and a second microphone input signal, respectively;

a voice detector module configured to process the first microphone input signal and/or the second microphone input signal, the voice detector module configured to detect own-voice of a user of the hearing device;

a processing unit configured to provide an electrical output signal; and a receiver configured to convert the electrical output signal to an audio output signal;

wherein the voice detector module is configured to communicate with the processing unit regarding a detection of the own-voice of the user after at least two criteria are satisfied, wherein the at least two criteria comprise a first criterion and a second criterion;

wherein the voice detector module comprises a spectrum analyzer, a controller, a subtractor, and a power analyzer coupled between the subtractor and the controller, and wherein the spectrum analyzer and the power analyzer are configured to provide respective outputs to the controller of the voice detector module.

28. The hearing device according to claim 27, wherein the power analyzer is configured for provision of a power parameter based on one or more input signals including the first microphone input signal, wherein the power parameter is the output provided by the power analyzer, and wherein the first criterion involves the power parameter.

29. The hearing device according to claim 27, wherein the first criterion also involves a power of an error signal, the error signal being based on (1) the first microphone input signal and (2) the second microphone input signal or a filtered signal obtained by filtering the second microphone input signal.

30. The hearing device according to claim 28, wherein the first criterion is satisfied if a power of an error signal is less than the power parameter.

31. The hearing device according to claim 28, wherein the first criterion is satisfied if $P\_1-P\_E>TH\_P$, wherein $P_1$ represents the power parameter, $P_E$ represents a power of an error signal, and $TH_P$ represents a threshold.

32. The hearing device according to claim 27, wherein the voice detector module comprises an adaptive filter, and wherein the subtractor is configured to obtain an output from the adaptive filter.

33. The hearing device according to claim 27, wherein the first microphone is an in-the-canal microphone, and the second microphone is an outer-ear microphone.

34. The hearing device according to claim 27, wherein the voice detector module of the hearing device is configured to determine the first criterion or the second criterion as being satisfied when a first spectrum parameter associated with the first microphone is less than a second spectrum parameter associated with the second microphone.

35. The hearing device according to claim 27, wherein the hearing device is configured to receive data from a contralateral hearing device indicating that a voice detection criterion associated with the contralateral hearing device is satisfied.

* * * * *